UNITED STATES PATENT OFFICE.

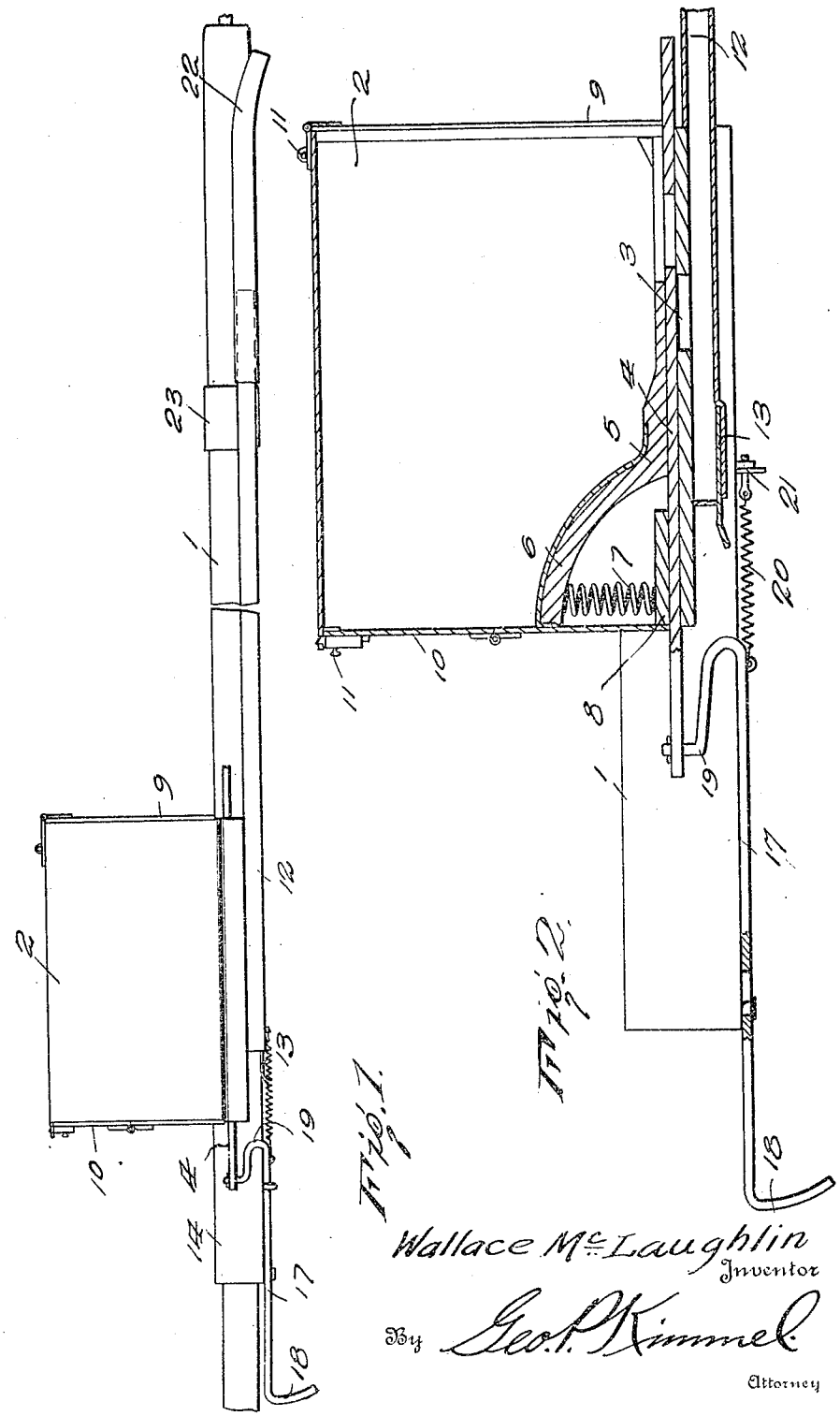

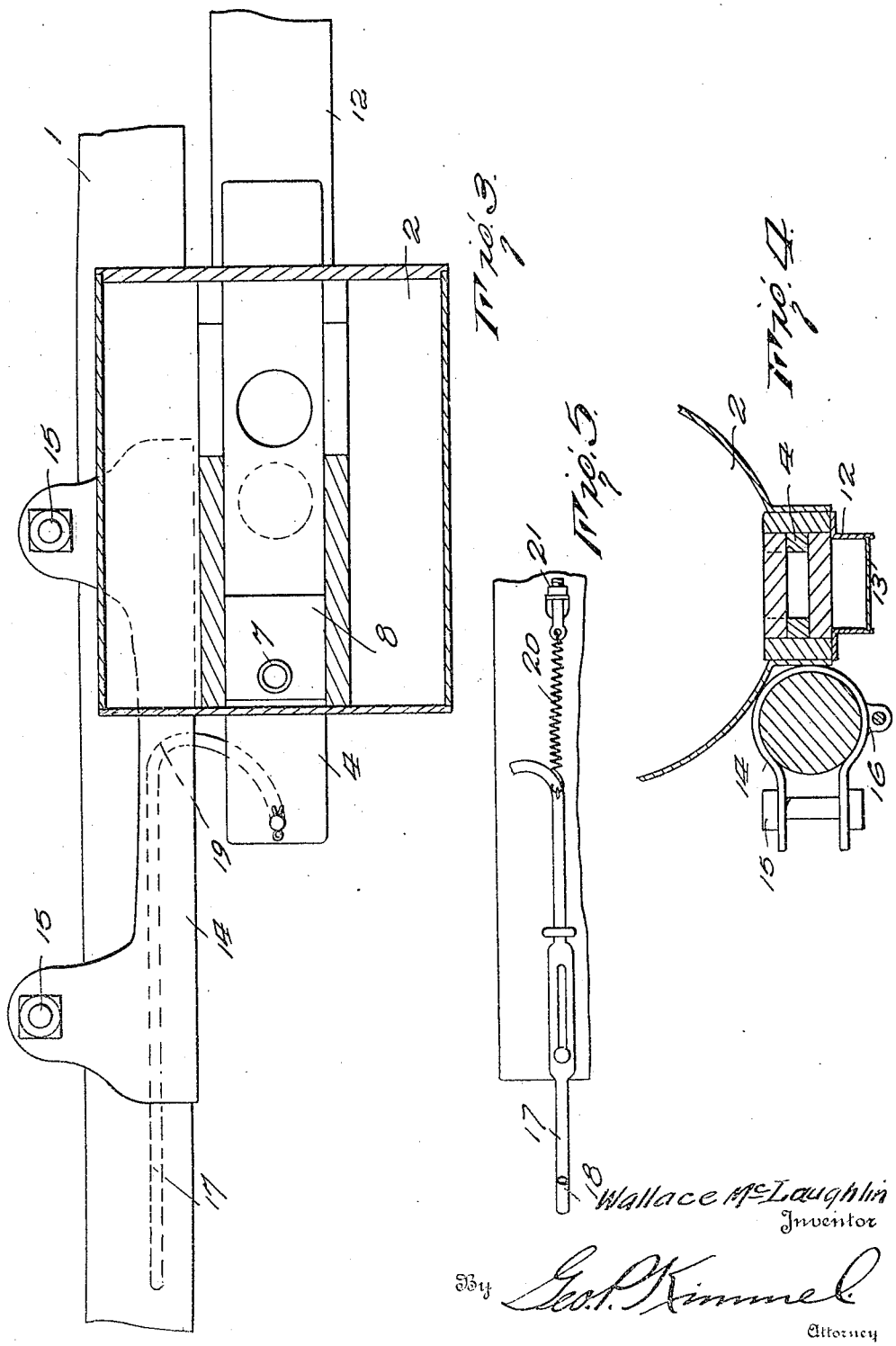

WALLACE McLAUGHLIN, OF FORT SCOTT, KANSAS.

SEED-PLANTING DEVICE.

1,291,973.  Specification of Letters Patent.  Patented Jan. 21, 1919.

Application filed October 11, 1918. Serial No. 257,736.

*To all whom it may concern:*

Be it known that I, WALLACE McLAUGHLIN, a citizen of the United States, residing at Fort Scott, in the county of Bourbon and State of Kansas, have invented certain new and useful Improvements in Seed-Planting Devices, of which the following is a specification.

This invention relates to improvements in agricultural implements and it is the principal object of the invention to provide a novel form of seed planting device particularly adapted for use in connection with a hoe or similar digging implement whereby to allow the planting of a predetermined number of seeds in the soil being worked or cultivated with said hoe.

Another and equally important object of the invention is to provide a seed planting device of the character mentioned which can be attached to practically all forms of gardening or other cultivating implements whereby the same can be used for planting seeds of different sizes and sorts.

Other objects will be in part obvious and in part pointed out hereinafter.

The improvements in the details and arrangement of parts will be apparent from an inspection of the accompanying drawings, in connection with the specific description hereinafter contained and wherein the preferred embodiment of the invention is disclosed for the purpose of imparting a full understanding thereof.

In the drawings:

Figure 1 is a side elevation of the improved seed planting device as applied to a fragment of a hoe handle, Fig. 2 is a vertical longitudinal section therethrough, Fig. 3 is a similar view taken at substantially right angles to the Fig. 2, Fig. 4 is a fragmentary detail in transverse section through the valve means of the seed planter hopper and the implement handle, and Fig. 5 is a detail in elevation of the means for facilitating operation of the valve or cut-off means.

Having more particular reference to the drawings, in connection with which like reference characters will designate corresponding parts throughout the several views, 1 represents a handle of a hoe or other similar digging implement which, as will be noted, has the seed hopper 2 arranged adjacent the same, said hopper having a discharge opening 3 formed in the rear wall thereof, which wall is provided with a guide way in which a slidable valve 4 is arranged, the opening in the valve being of a size to permit the passage of a predetermined number of seeds therethrough from the hopper 2. To normally maintain the slidable valve 4 in proper relation to the apertured rear wall of the hopper 2 I provide a bearing plate 5, offset at the rear end thereof as at 6 and engaging an expansible coil spring 7 thereunder, the remaining end of said spring having bearing on a second bearing plate 8 positioned adjacent one portion of the slidable valve 4.

As will be noted, the hopper 2 is provided with a hinged bottom 9 and a hinged top or closure 10, said top and bottom being provided with suitable forms of latches 11 for an obvious purpose.

Arranged substantially parallel to the outer side of the rear wall of the hopper 2 is a seed discharge chute or spout 12 having its end of the same adjacent the hopper 2 cut away and formed with guides for receiving a slidable closure 13 whereby access can be had to the same when desired.

A clamp 14 is secured to a portion of the hopper 2 adjacent the discharge chute 12 and is adapted to be engaged about the handle 1 of the hoe whereby bolts 15 or similar fastening devices can be passed through the free ends thereof; said clamp having apertured lugs 16 struck outwardly from one side thereof for slidably receiving a slotted pull rod 17 having the outer end of the same hooked as at 18 to provide an effectual form of handle while the inner end thereof is offset as at 19 and engaged with one end of the valve 4. To normally maintain the pull rod 17 in its innermost position and as a consequence permit said valve 4 to remain in closed position, a contractile coil spring 20 is engaged at one end thereof and has its remaining end secured to an apertured lug 21 struck outwardly from one side of the clamp 14; a suitable form of adjustable connection being employed in this particular instance to permit of various tensions from the spring.

It may be here noted that the free portion of the discharge chute 12 is extended from the hopper 2 along the hoe handle to a point in proximity to the hoe proper 1 whereupon it is curved outwardly as at 22 in a manner sufficient to allow free discharge of the seeds into the earth being worked or cultivated with the hoe; the intermediate portion of said chute being secured to the handle 1 by means of metal straps 23 passing about the same.

In using the improved device and assuming that it is clamped in position to the handle 1 of a hoe or similar gardening or cultivating implement, to drop the seed from the hopper 2 into the chute 12 it is only necessary to move the handle 17 outwardly against the tension of the spring 20, thus causing the opening in the slidable valve 4 to aline with the discharge opening in the rear wall of the seed hopper 2, whereupon the seeds will be dropped thereinto. Obviously, due to the arrangement of the lower end of the discharge chute 12 with relation to the hoe or digging member proper, the seeds passing through the discharge chute will be deposited directly in the soil, thus eliminating the wasting of the same due to wind or the like. I of course desire to have it understood that valve plates similar to the valve plate 4 but having various sized openings formed therein can be substituted for the one shown, depending of course, upon the particular sort of seed planted and upon the size of such seed. In this way, a user of the device can plant a predetermined number of seeds with the device.

As indicated, I do not wish to be understood as confining the invention to the particular embodiment chosen for illustration herein, nor to the exact construction, arrangement and adaption of parts shown and described, but I reserve the right to make any changes and alterations that fairly fall within the spirit and scope of the invention.

I claim:

In combination with the handle of a cultivating implement, a hopper detachably secured thereto having a discharge opening formed in the rear wall thereof and a longitudinally disposed guide way formed therein, an apertured valve plate slidable in said guide way adapted to be alined with the discharge opening at times, removable bearing means detachably engaged with one face of said valve plate, a discharge chute engaged at one end with said seed hopper adapted to receive a predetermined number of seeds from said valve plate, a pull rod connected to said valve plate for facilitating operation thereof, and adjustable spring means engaged with said pull rod for normally maintaining the same and the valve plate in the innermost positions.

In testimony whereof, I affix my signature hereto.

WALLACE McLAUGHLIN.

Copies of this patent may be obtained for five cents each, by addressing the "Commissioner of Patents, Washington, D. C."